United States Patent
Pierson

[15] 3,690,741
[45] Sept. 12, 1972

[54] EYELET FOR TRACK DRIVEN VEHICLE

[72] Inventor: Neil W. Pierson, P. O. Box 98, Roseau, Minn. 56751

[22] Filed: March 29, 1971

[21] Appl. No.: 128,814

[52] U.S. Cl....................305/38, 24/141, 74/231 R, 305/57
[51] Int. Cl. ...............................................B62d 55/24
[58] Field of Search..........305/35 EB, 38, 37, 56, 57; 198/193, 184; 74/231 R, 231 C, 231 P, 237; 24/141

[56] References Cited

UNITED STATES PATENTS

| | | |
|---|---|---|
| 2,330,192 | 9/1943 | Bednarek..................24/141 X |
| 2,461,849 | 2/1949 | Slemmons ...................305/38 |
| 3,515,443 | 6/1970 | Hallaman .....................305/38 |
| 3,580,647 | 5/1971 | Richards ..................74/231 P |
| 3,598,454 | 8/1971 | Richards................305/35 EB |

Primary Examiner—Richard J. Johnson
Attorney—Wicks & Nemer

[57] ABSTRACT

An improved eyelet for track driven vehicles allowing the track to be driven by the teeth of a drive sprocket extending through the eyelet is disclosed. The eyelet includes a head for mounting inside of the track and a hollow body extending from the head through an aperture in the track to fold over the track on the outside and hold the eyelet in the track. The eyelet head includes a set of parallel sides providing sliding support and a set of parallel sides providing guiding support for a slide rail suspension of the track driven vehicle. Further the head is curled back towards the track itself to grip the track. Also disclosed is a washer which may be used with the eyelet of the present invention also to grip the track. The washer may also include traction teeth extending downward from the outside of the track.

10 Claims, 11 Drawing Figures

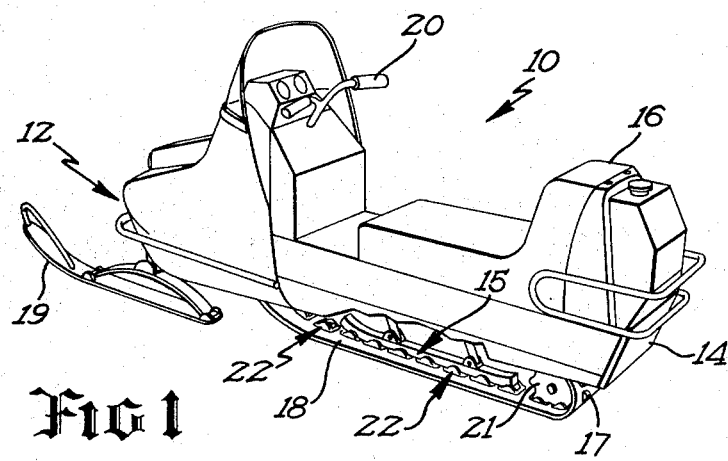
Fig 1
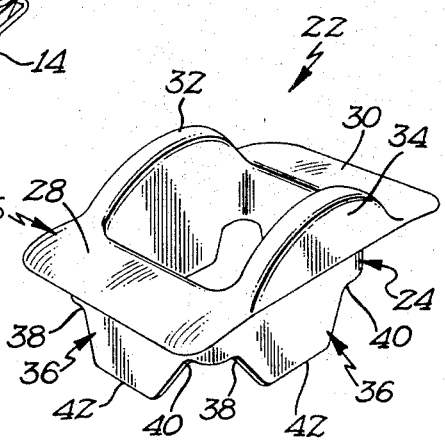
Fig 6
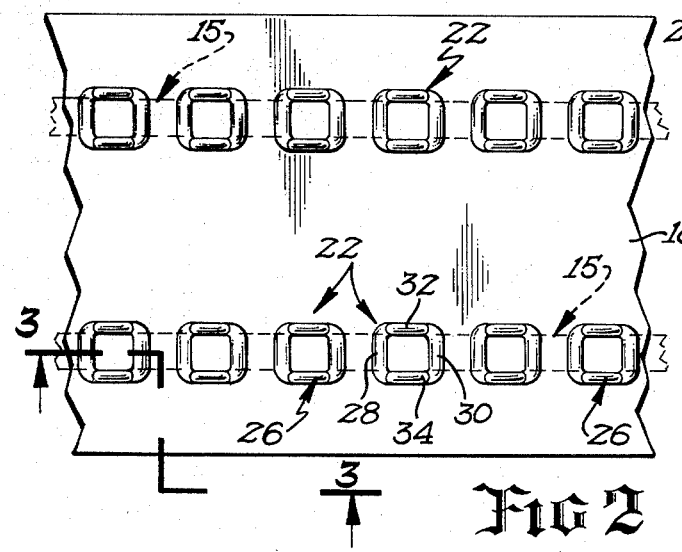
Fig 2
Fig 3
Fig 4
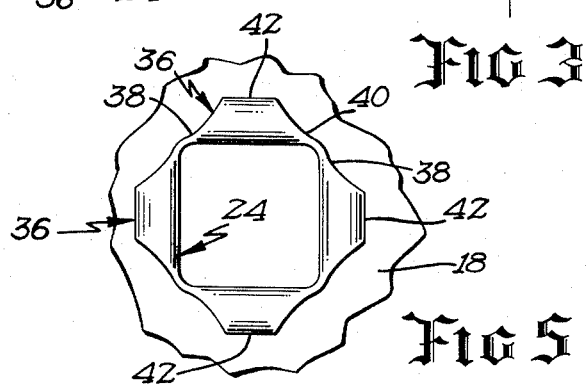
Fig 5
INVENTOR.
Neil W. Pierson
BY
Wicks & Nemer
ATTORNEYS

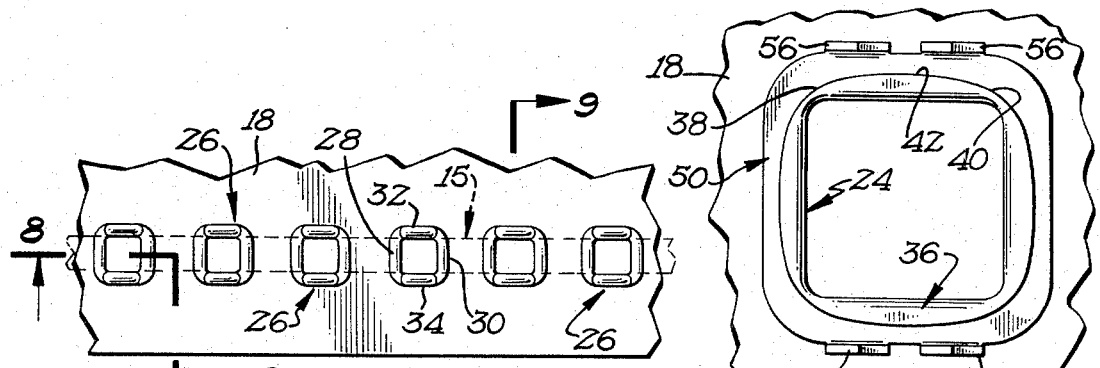
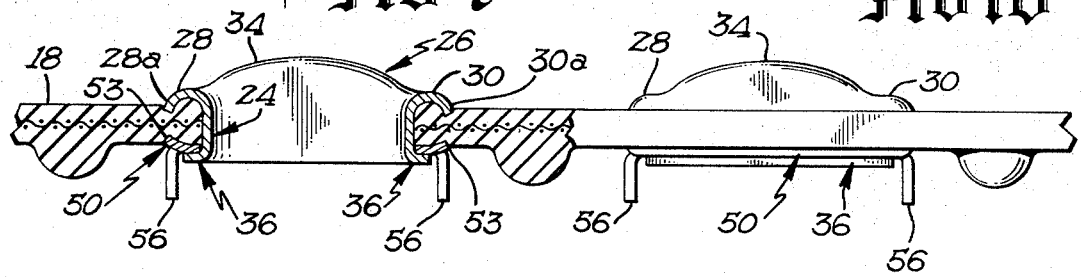
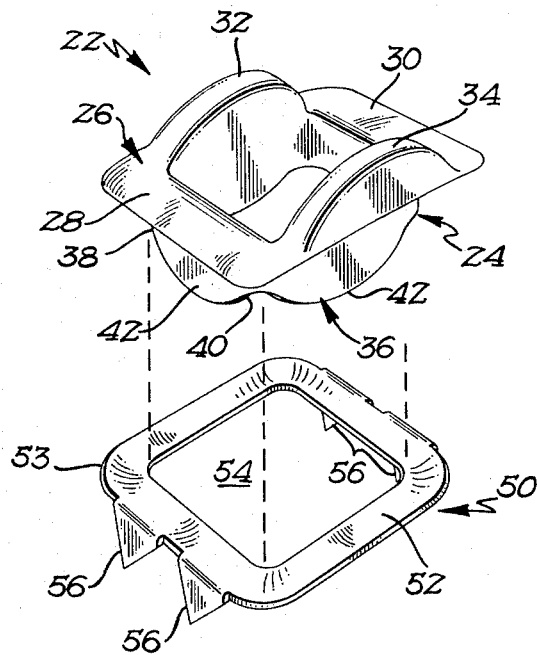
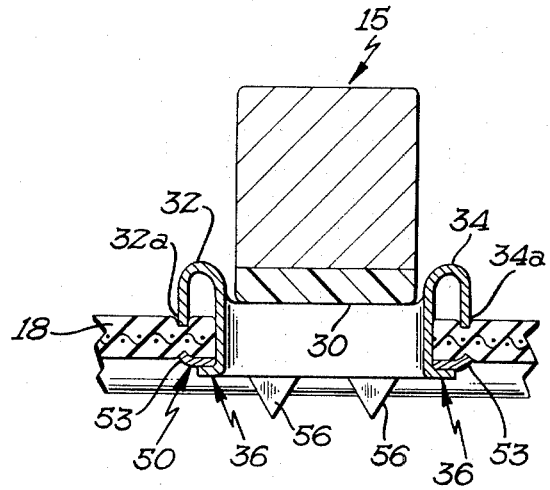

3,690,741

EYELET FOR TRACK DRIVEN VEHICLE

BACKGROUND

This invention relates generally to tracked vehicles and more specifically to eyelets for use in the tracks of such tracked vehicles.

With the advent and increasing popularity of tracked vehicles, for example snowmobiles, an increasing need exists for improvements in such vehicles especially in the area of the track. As is well known, the track is the driven portion of the vehicle which conveys power from the motor to the surface over which the vehicle is driven and propels the vehicle itself.

Uncleated tracks have been found useful; however, problems exist when an uncleated track is used with a slide rail system, in particular, due to the effect of frictional forces between the side rails and the track, and transverse movement of the track itself upon turning of the vehicle, for example, which may displace the track from its proper position. Further, known eyelets have encountered problems in remaining engaged in the track.

SUMMARY

The present invention solves the above and other problems of eyelets for tracked vehicles by providing a slide portion to reduce the friction between the track and the slide rail, for example, by providing a guide portion to maintain the transverse positioning of the track, and by providing a better gripping action to the track.

A preferred embodiment of the improved eyelet of the present invention includes a head integrally connected to a hollow body portion extending through the track and folding over the track on the opposite side to hold the eyelet in the track. The head includes parallel first sides arranged transversely to the intended direction of motion of the snowmobile and providing a sliding surface for the slide rails used in the suspension of the snowmobile. The head further provides two other raised sides arranged parallel to the intended direction of motion of the snowmobile and spaced about opposite sides of the slide rail to provide lateral support for the slide rail. In the preferred embodiment shown, the head is curled back towards the track at the outer free edges to provide a better gripping action of the eyelet on the track. Each side of the body of the eyelet extending through the track includes ends of a length substantially equal to but slightly greater than the depth of the track and a center of a length greater than the depth of the track to allow the center portion of each side to be folded outward and curled backward to the track to again allow better grip of the track. A washer arranged to fit over the body of the eyelet before the center portions of the ends are folded outward to the track is also used to grip the track due to its slight curl or curvature towards the track. Traction teeth may also be formed on the washer to provide better traction of the tracked vehicle itself.

It is thus an object of the present invention to provide an improved eyelet for a track driven vehicle.

It is a further object of the present invention to provide an improved eyelet allowing a lower frictional retarding force between the track and the suspension for the snowmobile.

It is a further object of the present invention to provide an improved eyelet which provides a guiding support for the suspension of the snowmobile.

It is a further object of the present invention to provide an improved eyelet having a better gripping action to the track than heretofore known.

These and further objects and advantages of the present invention will become clearer in the light of the following detailed description of the illustrative embodiments of this invention described in connection with the drawings.

DESCRIPTION OF THE DRAWINGS

FIG. 1 is a perspective view of a tracked vehicle, in the form of a snowmobile, with a portion thereof broken away to show the track incorporating the improved eyelet of the present invention.

FIG. 2 shows a top view of the inside surface of the track of FIG. 1 with the slide rails shown in phantom.

FIG. 3 is a sectional view of the eyelet of the present invention according to section line 3—3 of FIG. 2.

FIG. 4 is a further sectional view of the eyelet of the present invention according to the section line 4—4 in FIG. 3.

FIG. 5 is a fragmentary plan view of the outside surface of the track as indicated in FIG. 3.

FIG. 6 is a perspective view of the eyelet of the present invention before insertion into the track.

FIG. 7 is a top plan view of the inside surface of the track of FIG. 1, similarly to FIG. 2.

FIG. 8 is an enlarged sectional view of the eyelet and washer of the present invention according to the section line 8—8 in FIG. 7.

FIG. 9 is a further enlarged sectional view of the eyelet and washer of the present invention according to section line 9—9 in FIG. 7.

FIG. 10 is an enlarged bottom plan view of the outside surface of the track of FIG. 7, similarly to FIG. 5.

FIG. 11 is a perspective view of the eyelet and washer of the present invention.

DESCRIPTION

In FIG. 1, a snowmobile generally designated 10 is shown as including the conventional features of a body 12 including a tunnel portion 14 partially broken away to expose a slide rail suspension system 15, a seat 16 supported upon the tunnel portion 14, a motor (not specifically shown), a track 18 driven by the motor to propel the vehicle, and snowmobile guiding mechanism in the form of front skis 19 controlled by steering bars 20. With the exception of the improved eyelet of the present invention, generally designated 22, allowing the teeth 17 of a sprocket wheel similar to idler 21 to transfer power between the motor and the track 18, snowmobile 10 is of conventional design and not further discussed.

In FIG. 2 through 6, eyelet 22 is shown as including a hollow body 24 generally in the form of a hollow rectangular parallelepiped having open ends and integrally formed with the inner edges of a head generally designated 26.

Head 26 includes a first set of parallel sides 28 and 30 which sides are arranged transversely to the intended direction of motion of the track and provide a relatively flat slide and wear surface for the slide rail 15 in order to reduce friction and wear between the slide rail 15 and the track 18. The first set of sides 28 and 30 are integrally joined with two opposite parallel sides of the open parallelepiped forming body 24 at the inner edges of the sides 28 and 30 and at the topmost edge of the parallelepiped. Head 26 further includes a second set of parallel sides 32 and 34 arranged parallel to the intended direction of motion of the track, raised smoothly from the surface of the first set of sides 28 and 30, and spaced apart to provide a guiding action to and around the slide rail 15. Sides 32 and 34 maintain the longitudinal travel of the track 18 in line with slide rails 15 and maintain the position of the track 18 with respect to the slide rails 15 upon the turning of the snowmobile. The inner edges of guiding sides 32 and 34 are integrally joined to the second set of opposite parallel sides of the open parallelepiped at the topmost edge of the parallelepiped. As best seen in FIGS. 3 and 4, both the first set of parallel sides 28 and 30 and the second set of parallel sides 32 and 34 are curled towards the track at their outer free edges 28a, 30a, 32a, and 34a to further provide a gripping action of the eyelet 26 to the track 18 when the eyelet is installed in the track.

Body 24 includes four sides 36, each of which sides is trimmed and shaped in manufacture to include end portions 38 and 40 and a center portion 42. The ends 38 and 40 of each side 36 extend from the joinder with the inner ends of the head 26 outwardly of the track and in depth are otherwise substantially equal to but slightly greater than the depth of the track. Thus, when eyelet 22 is installed within the track with head 26 upon the inside surface of the track, ends 38 and 40, being substantially equal to but slightly greater than the depth of the track, extend through the track and extend slightly beyond the outside surface of the track. The center portion 42 of each side 36, however, is of a length greater than the length of the track to allow the center portion of each side 36 to extend beyond the outside surface of the track and be folded outwardly away from the preformed aperture in the track receiving the eyelet 22 and to be curled towards and over the outside surface of the track in a manner best seen in FIGS. 3, 4, and 5 to securely grip the track and hold the eyelet in the track.

In FIGS. 7 through 11, eyelet 22 of the present invention is shown as further including a washer 50 having a flat, rectangular body 52 encompassing an aperture 54 which allows the mounting of the washer around and about the body 24 of eyelet 22 on the outside surface of the track. The outer free edge 53 of the body 52 of washer 50 is curled inwardly toward the track, as shown, to grip and continue to grip the track when the sides 36 of the body 24 of eyelet 22 are folded over the washer 50 to secure the eyelet 22 to the track 18. Washer 50 in the embodiment shown further includes integrally formed depending traction teeth 56 which extend from the outer free edge 53 to provide better traction between the track 18 and the surface of the snow. As is well known to those skilled in the art, traction teeth 56 can have various shapes other than the pointed shape shown, and the number of teeth 56 may vary with the requirements of the user.

As can be seen from the figures, use of washer 50 allows sides 36 to be of a lesser dimension, as best seen in FIG. 10, than without the same of washer 50, as best seen in FIG. 5. The gripping action of center portion 42 of sides 36 to the track 18 is then performed by the curled edge 53 of washer 50. Also, in the embodiment of FIG. 10, sides 36 must be shorter than the outside dimension of washer 50 to avoid interfering with traction teeth 56. It will be obvious to those skilled in the art, however, that if desired sides 36 could extend beyond the outside dimension of washer 50 and provide an additional gripping action to track 18.

The eyelets 22 are installed in track 18 by first inserting body portion 24 of eyelet 22 through prepunched holes in the track and next placing the eyelet 22 with head 26 against an anvil and with a forming die against body 24. The forming die is then pressed towards the anvil until the sides 36 of eyelet 22 are curled outwardly towards and over the track 18 and tightly against and into the track 18 so as to hold eyelet 22 firmly in the track. The forming die also provides an outward curl at the end of the center portion 42 of each side 36 of body 24 in a manner that as the forming die is pressed towards the anvil, the curl at the end of each side 36 is pressed into the track, as best seen in FIGS. 3 and 4. The tightness of the insertion of eyelet 22 is determined by the distance which the forming die is pressed towards the anvil. If it is desired that washer 50 be used with eyelet 22, washer 50 is first placed around and about eyelet 22 on the outside surface of the track, with the curled portion 53 directed towards the track, and sides 36 are crimped or curled over the washer as best seen in FIG. 10. As best seen in FIGS. 8 and 9, the curled outer edge 53 of washer 50 remains curled and pressed into the track 18 to insure a good gripping action between the washer 50, and hence eyelet 22, and track 18.

As will be obvious to those skilled in the art, body portion 24 of eyelet 22, which forms the receiver for the teeth 17 of drive sprocket 21, will vary in size depending on the width and the length of the sprocket teeth it will receive. Various sprockets are used on tracked vehicles and the most commonly used vary from three-quarters of an inch wide to approximately 1½ inches wide. Further, the diameter of the sprocket and the number of teeth used on the sprocket will determine the spacing of eyelet 22 longitudinally around the track, and this spacing and the width of the sprockets used will determine the outside dimensions of eyelet 22. Common sprocket diameters are from 5 inches to approximately 8 with from six to 10 teeth. It is realized that no limitation to the above sprocket dimensioning is intended, and the dimensioning is included solely for guidance of those skilled in the art in proportioning the improved eyelet according to the present invention.

Thus, since the invention disclosed herein may be embodied in other specific forms without departing from the spirit or general characteristics thereof, some of which forms have been indicated, the embodiments described herein are to be considered in all respects illustrative and not restrictive the scope of the invention is indicated by the appended claims, rather than by the foregoing description, and all changes which come within the meaning and range of equivalency of the claims are intended to be embraced therein.

What is claimed is:

1. In an eyelet for the track of a slide rail or bogie wheel suspension track driven vehicle having an apertured head for mounting adjacent the inside surface of the track, a hollow body extending from the head through a preformed aperture in the track and allowing a portion of the body extending through the track to be folded over onto the outside surface of the track to hold the eyelet in the track and allow the track to be driven by teeth of a drive sprocket extending through the eyelet, the improvement comprising a head having at least two sets of parallel sides, the first set of parallel sides arranged transversely to the intended direction of motion of the track to provide a slide and wear surface for the slide rail to reduce friction and wear between the slide rail and the track, the second set of parallel sides arranged parallel to the intended direction of motion of the track, raised smoothly from the first set of sides and the head, and spaced apart to provide a guiding action to and around the slide rail to maintain the longitudinal positioning of the track with respect to the slide rail.

2. The eyelet of claim 1, wherein both the first set of parallel sides and the second set of parallel sides are curled towards the track at the outer edges thereof to provide a gripping action of the eyelet to the track when the eyelet is installed in the track.

3. The eyelet of claim 2 including a body portion having at least four sides, with the ends of each side extending outwardly of the track of a length substantially equal to but slightly greater than the depth of the track and with the center portion of each side of a length greater than the depth of the track to allow the center portions of the sides to be folded outwardly away from the preformed aperture in the track and be curled over, against and into the track to securely hold the eyelet in the track.

4. The eyelet of claim 3, wherein the body comprises a hollow rectangular parallelepiped having open ends, wherein the inner edges of the first set of parallel sides are joined with the first two parallel sides of the open parallelepiped at the inside end of the body, and wherein the inner edges of the second set of parallel sides are joined with the remaining two parallel sides of the parallelepiped at the inside end of the body.

5. The eyelet of claim 1, wherein the body comprises a hollow rectangular parallelepiped having open ends, wherein the inner edges of the first set of parallel sides are joined with the first two parallel sides of the open parallelepiped at the inside end of the body, and wherein the inner edges of the second set of parallel sides are joined with the remaining two parallel sides of the parallelepiped at the inside end of the body.

6. The eyelet of claim 5, further including a washer having a hollow body for allowing the mounting of the washer around and about the body of the eyelet on the outside of the track, the washer including an outside edge curled towards the track so as to grip and continue to grip the track when the sides of the body of the eyelet are folded over the washer to secure the eyelet to the track.

7. The eyelet and washer of claim 6, wherein the washer includes integrally formed ice or traction teeth extending outwardly from the washer for providing better traction between the track and the terrain over which the snowmobile is propelled.

8. The eyelet of claim 1, further including a washer having a hollow body for allowing the mounting of the washer around and about the body of the eyelet on the outside of the track, the washer including an outside edge curled towards the track so as to grip and continue to grip the track when the sides of the body of the eyelet are folded over the washer to secure the eyelet to the track.

9. The eyelet and washer of claim 8, wherein the washer includes integrally formed ice or traction teeth extending outwardly from the washer for providing better traction between the track and the terrain over which the snowmobile is propelled.

10. The eyelet of claim 1 including a body portion having at least four sides, with the ends of each side extending outwardly of the track of a length substantially equal to but slightly greater than the depth of the track and with the center portion of each side of a length greater than the depth of the track to allow the center portion of the sides to be folded outwardly away from the preformed aperture in the track and be curled over, against and into the track to securely hold the eyelet in the track.

* * * * *